US006986060B1

(12) United States Patent
Wong

(10) Patent No.: US 6,986,060 B1
(45) Date of Patent: Jan. 10, 2006

(54) METHOD AND APPARATUS FOR SHARING A SECURITY CONTEXT BETWEEN DIFFERENT SESSIONS ON A DATABASE SERVER

(75) Inventor: Daniel ManHung Wong, Sacramento, CA (US)

(73) Assignee: Oracle International Corp., Redwood Shores, CA (US)

( * ) Notice: Subject to any disclaimer, the term of this patent is extended or adjusted under 35 U.S.C. 154(b) by 0 days.

(21) Appl. No.: 09/577,220

(22) Filed: May 23, 2000

(51) Int. Cl.
H04L 9/00 (2006.01)
G06F 15/16 (2006.01)
G06F 17/30 (2006.01)

(52) U.S. Cl. .......................... 713/201; 713/202; 707/9; 709/229

(58) Field of Classification Search ................. 713/150, 713/164–168, 175, 176, 200–202; 709/217–219, 709/223, 225–229, 235; 707/1, 9, 10, 100; 714/47; 379/9.04
See application file for complete search history.

(56) References Cited

U.S. PATENT DOCUMENTS

| 5,699,518 | A | * | 12/1997 | Held et al. | 709/229 |
| 5,708,812 | A | * | 1/1998 | Van Dyke et al. | 717/171 |
| 5,768,519 | A | * | 6/1998 | Swift et al. | 709/223 |
| 6,058,389 | A | * | 5/2000 | Chandra et al. | 707/1 |
| 6,138,120 | A | * | 10/2000 | Gongwer et al. | 707/10 |
| 6,189,103 | B1 | * | 2/2001 | Nevarez et al. | 713/201 |
| 6,199,113 | B1 | * | 3/2001 | Alegre et al. | 709/229 |
| 6,243,751 | B1 | * | 6/2001 | Chatterjee et al. | 709/226 |
| 6,499,052 | B1 | * | 12/2002 | Hoang et al. | 709/203 |

OTHER PUBLICATIONS

Brown, "Remote Passphrase Authentication Part Two: HTTP Authentication Scheme", Mar. 25, 2996, Network Working Group, p. 1–7.*
"Component Object Model, Part II: Programming Interface", Oct. 24, 1995, Microsoft Corporation and Digital Equipment Corporation, Version 0.9 (Draft), p. 1–32.*

* cited by examiner

Primary Examiner—Christopher Revak
(74) Attorney, Agent, or Firm—Park, Vaughan & Fleming, LLP

(57) ABSTRACT

One embodiment of the present invention provides a system for sharing a security context between different sessions on a database server. The system operates by receiving a request at the database server through a database session between the database server and an application on a database client. The system looks up an identifier for an application client that was previously associated with the database session. The system uses this identifier to look up the security context containing attributes related to the application client within a storage area associated with the database server. Next, the system performs a database operation to satisfy the request and in doing so enforces access rights associated with the security context. In one embodiment of the present invention, the request includes a database query directed to a database on the database server. In one embodiment of the present invention, performing the database operation involves modifying the database query to enforce access rights associated with the security context. In one embodiment of the present invention, the identifier for the application client identifies a user of the application that is sending the request to the database server. In one embodiment of the present invention, the database client is an application server that is sending the request to the database server, and the identifier for the application client identifies an application session between the application on the application server and the client of the application.

18 Claims, 3 Drawing Sheets

METHOD AND APPARATUS FOR SHARING A SECURITY CONTEXT BETWEEN DIFFERENT SESSIONS ON A DATABASE SERVER

BACKGROUND

1. Field of the Invention

The present invention relates to providing security on database servers. More specifically, the present invention relates to a method and an apparatus for sharing a security context for a client between different sessions on a database server, wherein the security context is used enforce access rights on the database server.

2. Related Art

Many computer systems are presently built around a multi-tier architecture in which client machines in a client tier communicate with application servers in an application tier. These application servers in turn communicate with database servers in a database tier. This type of multi-tier architecture can scale to provide large amounts of computing power for applications that must process large volumes of traffic, such as heavily used web sites or enterprise computing systems.

In multi-tier architectures, security is typically enforced in the application tier. Users operating on client machines typically authenticate themselves to an application on an application server, which is responsible for maintaining client connections. This application typically uses a single identity to log into a database server in the database tier. Hence, all database requests originating from all of the client connections are channeled through the same application identity into the database server. Consequently, the database server must rely on the application to enforce security for client connections.

Instead of blindly relying on the application to enforce security, it is preferable to enforce security at the database server. However, there are a number of problems in doing so.

A given user may try to access a database through different connections with the database. For example, in a connection pooling arrangement, an application channels requests generated by a large number of users through a smaller number of connections with the database server. Hence, a given database connection handles requests for many users, and requests from a given user can be channeled through any one of the connections with the database server.

In another example, a given user may access the database through both a first application and a second application. In this case, the second application has no idea what type of access rights the first application has granted to the user. It is possible for the application developers for the first application and the second application to implement some type of ad hoc communication and synchronization mechanism between the first application and the second application in order to share security information for users. However, doing this requires a great deal of additional programming, and the developers must be very careful about how security information is communicated between applications.

In order to overcome the above-listed problems, what is needed is a method and an apparatus for efficiently sharing client-specific security information between different sessions on a database server.

SUMMARY

One embodiment of the present invention provides a system for sharing a security context between different sessions on a database server. The system operates by receiving a request at the database server through a database session between the database server and an application on a database client. The system looks up an identifier for an application client that was previously associated with the database session. The system uses this identifier to look up the security context containing attributes related to the application client within a storage area associated with the database server. Next, the system performs a database operation to satisfy the request and in doing so enforces access rights associated with the security context.

In one embodiment of the present invention, the request includes a database query directed to a database on the database server.

In one embodiment of the present invention, performing the database operation involves modifying the database query to enforce access rights associated with the security context.

In one embodiment of the present invention, the identifier for the application client identifies a user of the application that is sending the request to the database server.

In one embodiment of the present invention, the database client is an application server that is sending the request to the database server, and the identifier for the application client identifies an application session between the application on the application server and the client of the application. In a variation on this embodiment, the system additionally receives a request from the application to change the application session associated with the database session.

In response to the request, the system changes the application session associated with the database session. In a variation on this embodiment, the system facilitates connection pooling by periodically changing the application session associated with the database session in order to channel requests associated with multiple application sessions through the database session.

In one embodiment of the present invention, prior to receiving the request, the system receives the security context for the application client from the database client. The system inserts this security context into the storage area associated with the database server, so that the security context can be indexed by the identifier for the application client.

In one embodiment of the present invention, the system allows the application client to use the same security contexts through a second application. The system does this by: receiving a second request at the database server through the second database session with the second application; looking up the identifier for the application client, the identifier having been previously associated with the second database session; and using the identifier to look up the security context for the application client within the storage area associated with the database server.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Multi-Tier Architecture

Figure 1:
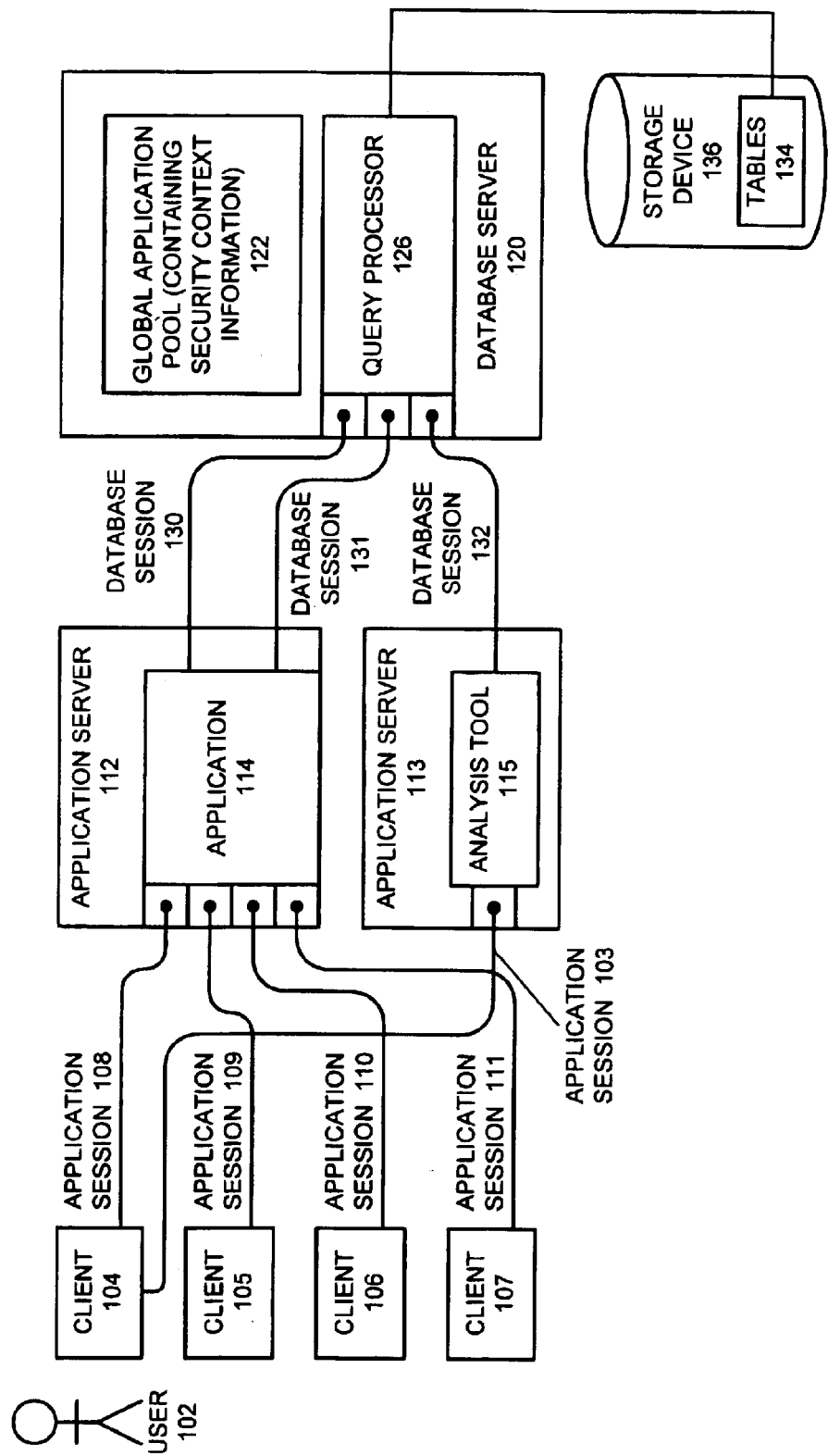
FIG. 1 illustrates a multi-tier architecture in accordance with an embodiment of the present invention.

FIG. 1 illustrates a multi-tier architecture in accordance with an embodiment of the present invention. This multi-tier architecture includes clients 104–107 coupled to application servers 112–113, which are in turn coupled to database server 120.

Note that clients 104–107, application servers 112–113 and database server 120 can generally be based on any type of computer system, including, but not limited to, a computer system based on a microprocessor, a mainframe computer, a digital signal processor, a personal organizer, a device controller, and a computational engine within an appliance.

Also note that computer systems 104–107, 112–113 and 120 are coupled together by a computer network (not shown). This network can include any type of wire or wireless communication channel capable of coupling together computing nodes. This includes, but is not limited to, a local area network, a wide area network, or a combination of networks. In one embodiment of the present invention, the network includes the Internet.

More specifically, clients 104–107 can include any node on the network including computational capability and including a mechanism for communicating across the network. Client 104 is operated by user 102 who accesses application 114 on application server 112 and analysis tool 115 on application server 113 through client 104.

Application servers 112–113 can include any nodes on the computer network including a mechanism for servicing requests from clients 104–107 for computational and/or data storage resources. Application server 112 hosts application 114, which communicates with clients 104–107. Application server 113 hosts analysis tool 115, which communicates with client 104.

Application 114 can generally include any type of application that can run on an application server. In one embodiment of the present invention, application 114 implements a web site that communicates with web browsers located within clients 104–107.

Application 114 communicates with clients 104–107 through application sessions 108–111, respectively. Note that the terms "session" and "connection" are used interchangeably throughout this specification to refer to active communication links between computer systems. Note that application server 112 maintains state information for each of application sessions 108–111. Similarly, analysis tool 115 communicates with client 104 through application session 103, and application server 113 maintains state information for application session 103.

Database server 120 can include any node on a computer network including a mechanism for servicing requests from a client to perform database operations. Database server 120 contains query processor 126 and global application pool 122. Query processor 126 performs data processing operations for queries submitted by application servers 112–113 to database server 120. In performing these queries, query processor 126 uses security context information from global application pool 122 in order to enforce access rights for users/clients of application servers 112–113.

Database server 120 communicates with storage device 136, which contains tables 134 for storing database data. Storage device 136 can include any type of non-volatile storage device that can be coupled to a computer system. This includes, but is not limited to, magnetic, optical, and magneto-optical storage devices, as well as storage devices based on flash memory and/or battery-backed up memory.

Database server 120 communicates with application 114 on application server 112 through database sessions 130 and 131. Note that application 114 performs connection pooling, which causes requests from clients 104–107 to be channeled through database sessions 130–131. Note that connection pooling systems generally channel requests from a large number of clients into a much smaller number of connections with a database server. Database server 120 also communicates with analysis tool 115 on application server 113 through database session 132.

Process of Initializing Security Context

Figure 2:
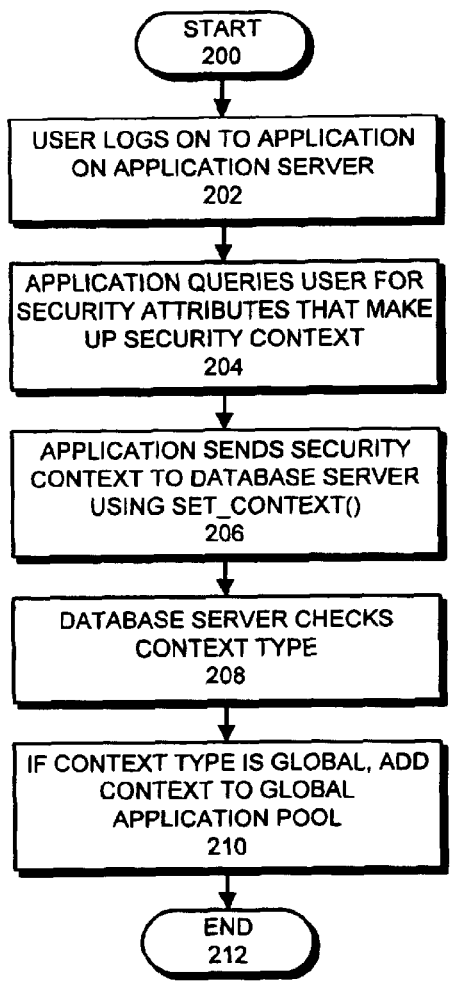
FIG. 2 is a flow chart illustrating the process of using a security context to enforce access rights for a user in accordance with an embodiment of the present invention.

FIG. 2 is a flow chart illustrating the process of adding a security context to a database server 120 in accordance with an embodiment of the present invention. First, user 102 logs onto application 114 through client 104 (step 202). This typically involves some type of authentication, such as asking user 102 for a password. Next, application 114 queries user 102 (and potentially other sources) for security attributes that make up a security context for user 102 (step 204). These attributes can include, but are not limited to, items such as a department that user 102 belongs to, the responsibilities of user 102 and specific access privileges of user 102. This querying process may involve validating the information provided by user 102 against data from other sources.

Next, application 114 sends the attributes related to user 102 that make up the security context to database server 120 (step 206). In one embodiment of the present invention, this is accomplished by first assigning a session ID to user 102, such as 12345, and then using the function call

SET_CONTEXT('HR', 'RESP', '13', 'APPSMGR', '12345');

to record a context for user 102 in global application pool 122 on database server 120. This function call specifies that for session ID 12345 there is an application context 'RESP' with a value '13' in the 'HR' namespace. Furthermore, this context can only be read by database user 'APPSMGR'. 'HR' is a global context namespace previously created using the function call:

CREATE CONTEXT hr USING hr.init ACCESSED GLOBALLY;

The above-described context can be used for connection pooling purposes as is described in more detail below with reference to FIG. 3.

A context can also be created to enable multiple database sessions to share the same context using the function call:

SET_CONTEXT('HR', 'RESP', '13', 'SCOTT', NULL);

This allows the user "SCOTT" to use the same security context when logging into through database session 130 from application 114, or through database session 132 from analysis tool 115.

Upon receiving a new security context, database server 120 checks the context type (step 208). If the context type is global, database server 120 adds the new context to global application pool 122 (step 210). Note that contexts can be stored within global application pool 122 using any type of indexing structure that allows contexts to be retrieved based upon a user name and/or a session ID.

Process of Using a Security Context in a Connection Pooling Arrangement

Figure 3:
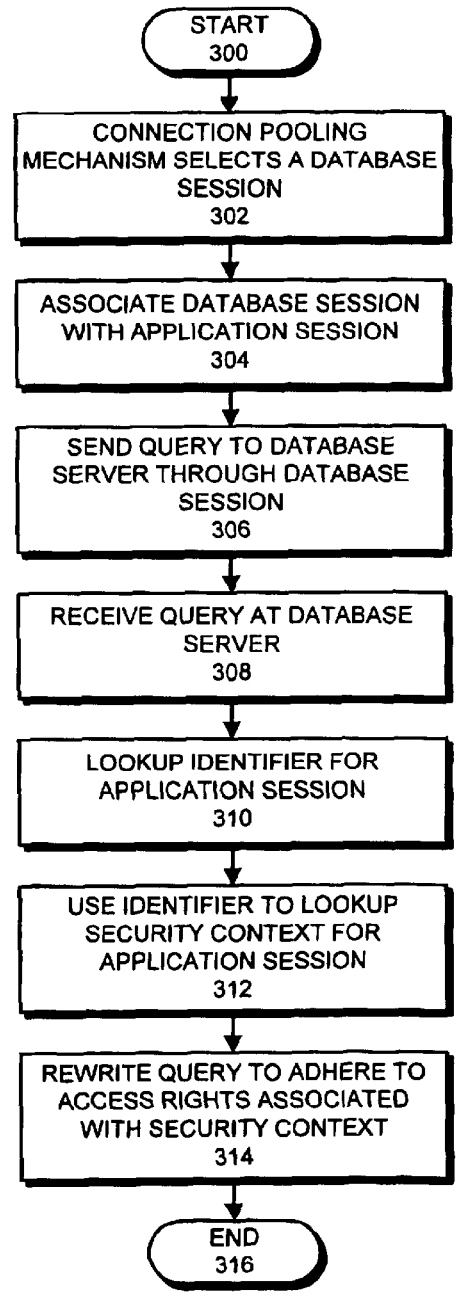
FIG. 3 is a flow chart illustrating the process of using a security context to enforce security in a connection pooling arrangement in accordance with an embodiment of the present invention.

FIG. 3 is a flow chart illustrating the process of using a security context to enforce security in a connection pooling arrangement in accordance with an embodiment of the present invention. A connection pooling mechanism within application 114 first selects a database session (step 302). Next, the connection pooling mechanism associates a database session with a client (step 304). For example, the connection pooling mechanism can assign user 102 on client 104 to database session 130. This can be accomplished using the function call:

SET_IDENTIFIER('12345');

This function call specifies that database session 130 belongs to application session ID '12345'.

Next, the application 114 sends a query to database server 120 on behalf of user 102 (step 306). This query is sent to database server 120 through database session 130 (step 306).

Database server receives the query (step 308), and retrieves the security context for the session. This is accomplished by using the function call:

SYS_CONTEXT('HR', 'RESP');

This function call looks up identifier 12345, which is currently associated with database session 130 (step 310), and uses identifier '12345' to lookup the security context ('HR', 'RESP', '13', 'APPSMGR', '12345') from global application pool 122 (step 312). This function call returns the value '13'.

In one embodiment of the present invention, this lookup involves looking up (database user, application session ID) pairs in the following way. The system first looks up ('APPSMGR', '12345')(which in this case returns a context). If this does not return a context, the system looks up ('APPSMGR', NULL) for the same user, but another session ID. If this does not return a context, the system looks up (NULL, '12345') for the same session ID, but another user. If this does not return a context, the system looks up (NULL, NULL) for all users and all session IDs. If this does not return a context, the system indicates that a context was not found.

The value '13'returned by the lookup is used to rewrite the query, if necessary, to adhere to the security context (step 314). For example, suppose a user issues the select statement, SELECT*FROM payroll;

This select statement can be rewritten as follows to restrict the user to only view payroll entries from the user's own department:

SELECT*FROM payroll WHERE dept=users_dept;

Note that the above-described security enforcement process can be used to facilitate selectively switching a large number of application sessions 108–111 between a smaller number of database sessions 130–131 for connection pooling purposes.

Also note that a function call "CLEAR_IDENTIFIER0;" can be used to reset all application session identifiers associated with database session 130 when exiting database session 130.

Process of Using a Security Context for a Single User Application

Figure 4:
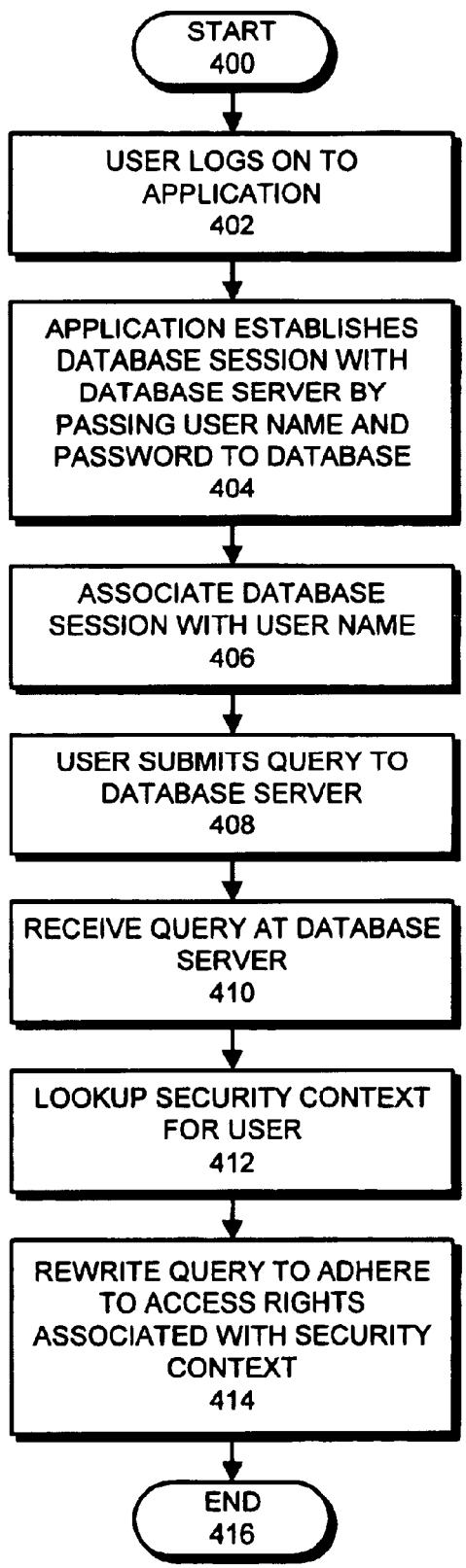
FIG. 4 is a flow chart illustrating the process of using a security context for an application operated by a single user in accordance with an embodiment of the present invention.

FIG. 4 is a flow chart illustrating the process of using a security context to enforce access rights for a user 102 in accordance with an embodiment of the present invention. User 102 first logs onto an application, such as analysis tool 115 on application server 113 (step 402). Next, analysis tool 115 establishes a database session 132 with database server 120 by forwarding a username and password to database server 120 (step 404). The system also associates database session 132 with the username, 'SCOTT', for user 102 (step 406). This user name 'SCOTT' is specified when the user logs into the system.

Next, analysis tool 115 submits a query to database server 120 (step 408), and the query is received at database server 120 (step 410). In order to process the query, database server 120 looks up the security context for the query (step 412). by using the function call

SYS_CONTEXT('HR','RESP');

This function call looks up identifier 'SCOTT' currently associated with database session 132, and uses the identifier 'SCOTT' to lookup the security context ('HR', 'RESP', '13', 'SCOTT', NULL) from global application pool 122. This function call returns the value '13'.

This value '13' is used to rewrite the query, if necessary, to adhere to the security context (step 4–14).

Note that the above-described process can allow a user, such as SCOTT, to make use of the same security context through either application 114 and database session 130, or through analysis tool 115 and database session 132.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for sharing a security context for a given application client between different applications associated with the given application client on a database server, comprising:

receiving a request at the database server through a database session between the database server and an application on a database client;

looking up an identifier for the given application client that identifies a client of the application, wherein the identifier for the given application client identifies a user of the application that is sending the request to the database server, the identifier having been previously associated with the database session;

using the identifier to look up the security context for the given application client within a storage area associated with the database server;

wherein the security context includes attributes related to the given application client;

wherein only applications associated with the given application client will receive the security context for the given client;

receiving the security context for the given application client from the database client;

inserting the security context into the storage area associated with the database server so that the security context can be indexed by the identifier for the given application client;

performing a database operation to satisfy the request;

wherein performing the database operation involves enforcing access rights associated with the security context; and allowing the given application client to use the same security context through a second application and a second database session by:
- receiving a second request at the database server through the second database session with the second application,
- looking up the identifier for the given application client, the identifier having been previously associated with the second database session, and
- using the identifier to look up the security context for the given application client within the storage area associated with the database server.

2. The method of claim 1, wherein the request includes a database query directed to a database on the database server.

3. The method of claim 2, wherein performing the database operation involves modifying the database query to enforce access rights associated with the security context.

4. The method of claim 1,
- wherein the database client is an application server that is sending the request to the database server; and
- wherein the identifier for the given application client identifies an application session between the application on the application server and the client of the application.

5. The method of claim 4, further comprising:
- receiving a request from the application to change the application session associated with the database session; and
- changing the application session associated with the database session.

6. The method of claim 4, further comprising facilitating connection pooling by periodically changing the application session associated with the database session in order to channel requests associated with multiple application sessions through the database session.

7. A computer-readable storage medium storing instructions that when executed by a computer cause the computer to perform a method for sharing a security context for a given application client between different applications associated with the given application client on a database server, the method comprising:
- receiving a request at the database server through a database session between the database server and an application on a database client;
- looking up an identifier for the given application client that identifies a client of the application, wherein the identifier for the given application client identifies a user of the application that is sending the request to the database server, the identifier having been previously associated with the database session;
- using the identifier to look up the security context for the given application client within a storage area associated with the database server;

wherein the security context includes attributes related to the given application client;

wherein only applications associated with the given application client will receive the security context for the given client;

receiving the security context for the given application client from the database client;

inserting the security context into the storage area associated with the database server so that the security context can be indexed by the identifier for the given application client;

performing a database operation to satisfy the request;

wherein performing the database operation involves enforcing access rights associated with the security context; and allowing the given application client to use the same security context through a second application and a second database session by:
- receiving a second request at the database server through the second database session with the second application,
- looking up the identifier for the given application client, the identifier having been previously associated with the second database session, and
- using the identifier to look up the security context for the given application client within the storage area associated with the database server.

8. The computer-readable storage medium of claim 7, wherein the request includes a database query directed to a database on the database server.

9. The computer-readable storage medium of claim 8, wherein performing the database operation involves modifying the database query to enforce access rights associated with the security context.

10. The computer-readable storage medium of claim 7,
- wherein the database client is an application server that is sending the request to the database server; and
- wherein the identifier for the given application client identifies an application session between the application on the application server and the client of the application.

11. The computer-readable storage medium of claim 10, wherein the method further comprises:
- receiving a request from the application to change the application session associated with the database session; and
- changing the application session associated with the database session.

12. The computer-readable storage medium of claim 10, wherein the method further comprises facilitating connection pooling by periodically changing the application session associated with the database session in order to channel requests associated with multiple application sessions through the database session.

13. An apparatus that facilitates sharing a security context for a given application client between different applications associated with the given application client on a database server, comprising:
- a receiving mechanism that is configured to receive a request at the database server through a database session between the database server and an application on a database client;

wherein the receiving mechanism is further configured to receive the security context for the given application client from the database client;

wherein the receiving mechanism is further configured to receive a second request at the database server through a second database session between the database server and a second application;

a lookup mechanism that is configured to look up an identifier for an given application client that identifies a client of the application, wherein the identifier for the given application client identifies a user of the application that is sending the request to the database server, the identifier having been previously associated with the database session;

wherein the lookup mechanism is configured to use the identifier to look up the security context for the given application client within a storage area associated with the database server;

wherein the lookup mechanism is further configured to look up the identifier for the given application client, the identifier having been previously associated with the second database session;

wherein the lookup mechanism is further configured to use the identifier to look up the security context for the given application client within the storage area associated with the database server;

wherein the security context includes attributes related to the given application client;

wherein only applications associated with the given application client will receive the security context for the given client;

a security context initialization mechanism that is configured to insert the security context into the storage area associated with the database server so that the security context can be indexed by the identifier for the given application client; and a database engine that is configured to perform a database operation to satisfy the request;

wherein performing the database operation involves enforcing access rights associated with the security context.

14. The apparatus of claim 13, wherein the request includes a database query directed to a database on the database server.

15. The apparatus of claim 13, wherein the database engine is configured to perform the database operation by modifying the database query to enforce access rights associated with the security context.

16. The apparatus of claim 13,
wherein the database client is an application server that is sending the request to the database server; and
wherein the identifier for the given application client identifies an, application session between the application on the application server and the client of the application.

17. The apparatus of claim 16, wherein the receiving mechanism is additionally configured to receive a request from the application to change the application session associated with the database session; and
further comprising a changing mechanism that is configured to change the application session associated with the database session in response to the request.

18. The apparatus of claim 17, wherein the changing mechanism is further configured to facilitate connection pooling by periodically changing the application session associated with the database session in order to channel requests associated with multiple application sessions through the database session.

* * * * *